J. R. WEATHERLY.
LEVER.
APPLICATION FILED MAY 15, 1909.
939,574.
Patented Nov. 9, 1909.
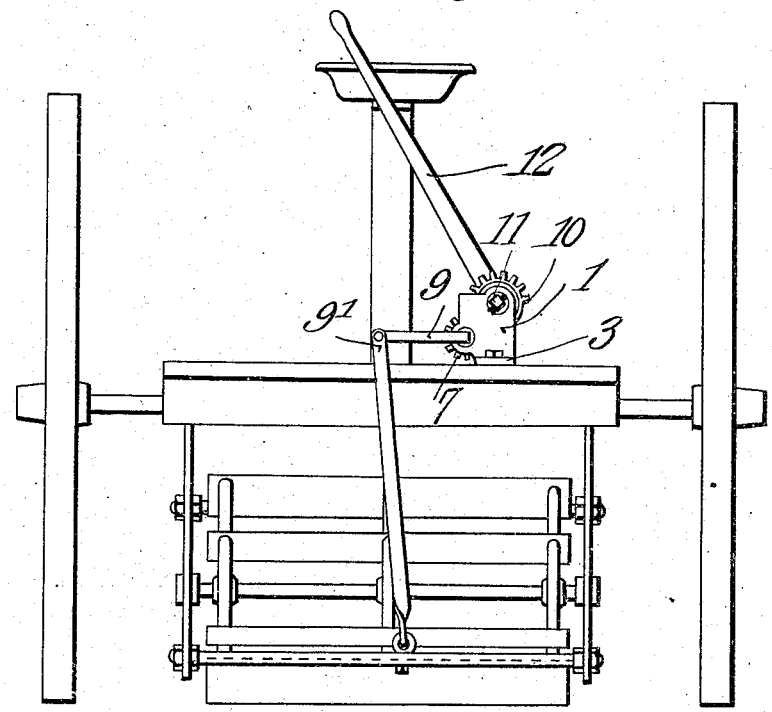
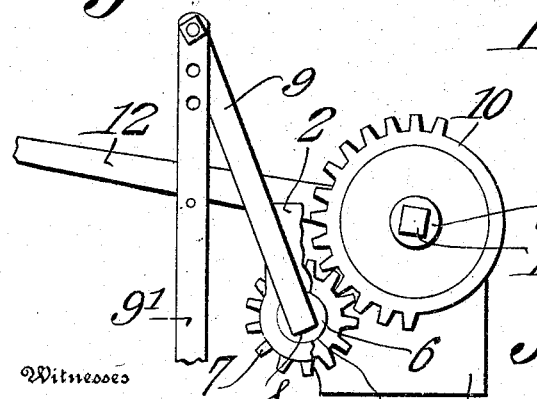
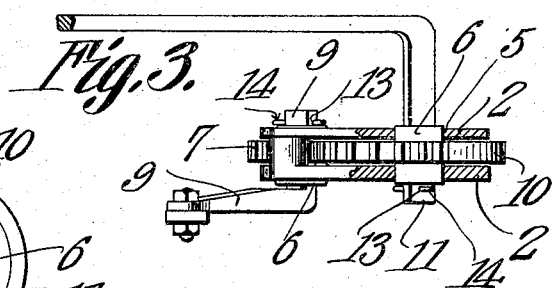
Inventor
John R. Weatherly.
By C. A. Snow & Co.
Attorneys
Witnesses

UNITED STATES PATENT OFFICE.

JOHN R. WEATHERLY, OF AMERICUS, GEORGIA, ASSIGNOR OF ONE-HALF TO JOHN T. TAYLOR, OF AMERICUS, GEORGIA.

LEVER.

939,574.  Specification of Letters Patent.  Patented Nov. 9, 1909.

Application filed May 15, 1909. Serial No. 496,142.

*To all whom it may concern:*

Be it known that I, JOHN R. WEATHERLY, a citizen of the United States, residing at Americus, in the county of Sumter and State of Georgia, have invented a new and useful Lever, of which the following is a specification.

This invention relates to levers for operating stalk cutters, plows and other agricultural implements for the purpose of raising and lowering the same in order that the machine may be moved from field to field or be thrown into operative position, and the object of the invention is to provide a simple and efficient device by which the operating lever or handle may remain stationary while the crank arm or link connected to the plow beam or other implement may vibrate to accommodate itself to the unevenness of the ground over which the machine is traveling. This object is attained by the use of the device illustrated in the accompanying drawings, and the invention resides in certain novel features thereof as will be hereinafter first fully set forth and then pointed out in the appended claims.

In the drawings referred to, Figure 1 is an elevation of my device, showing it applied to a stalk cutter of the type shown in my copending application, Serial No. 474647, filed January 28, 1909. Fig. 2 is a similar view partly broken away, showing the cutter raised. Fig. 3 is a detail plan view.

In carrying out my invention, I bolt or otherwise rigidly secure to the frame of the agricultural implement, a housing 1, consisting of spaced parallel plates 2, one of which is provided with a lateral lip or flange 3 to facilitate its attachment to the machine. The plates are held together by suitable fastening bolts and are constructed with alined openings 5, adapted to receive and form bearings for the journals or trunnions 6 of a pair of gears. The lower gear is a complete pinion provided with teeth 7 playing between the plates of the housing and having an angular axial opening 8 to receive the angular stub end of a crank arm 9, which will be connected to the plow beam or other part by a link 9', as shown and as will be readily understood. The upper gear is mutilated, as indicated at 10, and is also provided with an angular axial opening to receive the angular rocking end 11 of the operating handle or lever 12 which will extend upward within convenient reach of the driver. The stub end of the crank arm 9 and the extremity of the rocking end 11 of the operating lever are provided with transverse openings 13 through which cotter pins 14 are inserted to retain the said parts in engagement with the respective gears.

The operation and advantages of the device will, it is thought, be readily appreciated. When the machine is in use, the mutilated portion of the upper, larger gear will be adjacent the teeth of the lower gear and the said gear may then oscillate without meshing with the driving gear. Consequently the plow beam or the stalk cutter may readily vibrate according to the unevenness of the ground without causing any vibration of the up-standing operating lever. When it is desired to move the machine to a distant field, the lever will be thrown to one side as shown in Fig. 2, and the teeth of the mutilated gear will then be thrown into mesh with the pinion and the movement of the operating lever will be transmitted from the said gears to the crank arm and from the said crank arm through the link so as to raise the plow beam or other implement and permit the machine to be drawn from the field without the tool being injured by striking obstructions or taking into the surface of the earth where such action is not desired. Should it be desired to cause the plow or other implement to take deeper into the ground, the operating lever is thrown to the opposite side and the crank arm and its attached link will then be moved in the direction opposite to that above described. It is to be noted that the crank arm and the lever are removably attached to their respective gears and that they can therefore be removed and then again fixed in place in a different angular relation to the gear so that the parts may be assembled with any desired adjustment and to effect any desired result by manipulation of the lever. The housing will protect the teeth of the gears against injury and will also serve to maintain them in their proper operative relation.

The device is very simple in construction and is efficient in operation.

Having thus described my invention, what I claim is:—

1. The combination with an agricultural implement, of a crank arm attached thereto, an operating lever, and connections between the lever and the crank arm whereby the crank arm may be raised or lowered at will and when lowered may vibrate independently of the operating lever.

2. The combination with an agricultural implement, of a crank arm, connections between the crank arm and the implement, a pinion mounted on said crank arm, a mutilated gear arranged to mesh with said pinion and rotate the same to raise or lower the crank arm and to bring its mutilated portion against the pinion to permit free vibration of the same when the implement is at work, and means for operating the said mutilated gear.

3. The combination with an agricultural machine, of a housing secured thereon, a pinion mounted in said housing, and containing an angular axial bore, a crank arm secured in said bore, a mutilated gear arranged to mesh with said pinion and also having an angular axial bore, and an operating lever having an angular rocking end removably held in said bore.

In testimony that I claim the foregoing as my own, I have hereto affixed my signature in the presence of two witnesses.

JOHN R. WEATHERLY.

Witnesses:
E. HUME TALBERT,
C. E. DOYLE.